(12) United States Patent
Dinu et al.

(10) Patent No.: US 12,237,799 B2
(45) Date of Patent: Feb. 25, 2025

(54) ELECTRIC MOTOR CONTROL

(71) Applicant: Hamilton Sundstrand Corporation, Charlotte, NC (US)

(72) Inventors: Andrei Dinu, Leicester (GB); Stefanos Skoulaxinos, Cannock (GB); Jonathan Mark Roadley-Battin, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 117 days.

(21) Appl. No.: 18/158,112

(22) Filed: Jan. 23, 2023

(65) Prior Publication Data
US 2023/0246571 A1 Aug. 3, 2023

(30) Foreign Application Priority Data
Jan. 28, 2022 (EP) .................................. 22386004

(51) Int. Cl.
*H02P 6/21* (2016.01)
(52) U.S. Cl.
CPC ........................ *H02P 6/21* (2016.02)
(58) Field of Classification Search
CPC .... H02P 6/21; H02P 6/16; H02P 6/182; H02P 9/009; H02P 21/18; H02P 2203/07
USPC ....................................................... 318/400.11
See application file for complete search history.

(56) References Cited

U.S. PATENT DOCUMENTS

| | | | |
|---|---|---|---|
| 5,223,772 A | 6/1993 | Carobolante | |
| 8,638,054 B2 | 1/2014 | Henderson et al. | |
| 8,766,571 B2 | 7/2014 | Pollock et al. | |
| 9,106,177 B2* | 8/2015 | Son | H02P 21/14 |
| 9,114,712 B2 | 8/2015 | Dietrich et al. | |
| 9,991,834 B2 | 6/2018 | Marcinkiewicz et al. | |
| 10,291,160 B1 | 5/2019 | Latham et al. | |
| 10,637,378 B2 | 4/2020 | Wangemann et al. | |
| 2004/0070360 A1* | 4/2004 | E. Schulz | H02P 6/183 318/700 |
| 2005/0216225 A1 | 9/2005 | Anghel et al. | |
| 2020/0321824 A1 | 10/2020 | Selvaraj et al. | |
| 2020/0389109 A1 | 12/2020 | Yajurvedi et al. | |
| 2020/0389110 A1* | 12/2020 | Yajurvedi | H02P 29/0241 |

OTHER PUBLICATIONS

European Search Report for Application No. 22386004.0, mailed Jun. 24, 2022, 8 pages.

* cited by examiner

*Primary Examiner* — Kawing Chan
(74) *Attorney, Agent, or Firm* — CANTOR COLBURN LLP

(57) ABSTRACT

Methods of operating electric motor systems that comprise electric motors comprising a rotor having a magnet mounted thereto. The electric motor is initially operated in an open loop mode in which the rotor angle is estimated based on the input voltage frequency. Once the motor is running at sufficient speed, a transition to closed loop mode operation is performed, wherein the rotor angle is determined using an observed back EMF. To provide a smoother open loop to closed loop transition, the rotor angle is determined during a transition period as a function of both the open loop rotor angle and the closed loop rotor angle.

15 Claims, 4 Drawing Sheets

ELECTRIC MOTOR CONTROL

CROSS-REFERENCE TO RELATED APPLICATIONS

This application claims priority to European Patent Application No. 22386004.0 filed Jan. 28, 2022, the entire contents of which is incorporated herein by reference.

TECHNICAL FIELD

The technology described herein relates to the operation of electric motors, and in particular to the control of permanent magnet electric motors.

BACKGROUND

In the aerospace industry, there is currently a trend towards so-called More Electric Aircraft (MEA) whereby loads such as flight control surfaces, landing gear, actuators, fans, pumps etc. which have traditionally been controlled by hydraulic and mechanical systems are now being designed to be controlled electrically by means of an electric motor. For example, newer generations of high lift systems are envisaged to be highly flexible, distributed and actively controlled using Electro Mechanical Actuators (EMAs) that are driven by an electric motor drive system.

Typical motor drive systems consist of a single motor driven by an inverter. To reduce weight and size, permanent magnet motors are often used since they typically have a higher torque/power density ratio in comparison to other motor alternatives such as switched reluctance or induction motors. In a permanent magnet motor, the motor comprises a stator and a rotor having a magnet mounted thereto. An electric circuit is provided that comprises a plurality of phases or windings for driving rotation of the rotor when, in a drive mode, the phases or windings receive a current from an electrical power supply.

In order to provide accurate motor control, it is desirable to know the position of the rotor (the rotor angle) during motor operation. For example, once the rotor angle is known, the rotor speed can then also be determined, and used appropriately for speed control.

Traditionally, the rotor angle has been determined using dedicated position sensors installed within the motor. However, these sensors, and their connections, add extra weight and bulk to the system that may be undesirable, especially for aircraft applications.

Thus, another possibility is to provide a "sensorless" control where the rotor angle is instead determined using current and voltage information from the motor, which information can then be processed to determine the rotor position (and, in turn, the rotor speed). Various examples of "sensorless" motor control schemes are known but typically this may involve monitoring an induced voltage in the stator that opposes the change in magnetic flux caused by the spinning rotor that caused the induced voltage (i.e. the counter or 'back' electromotive force (back EMF)). This can work well to provide more accurate motor control, in a 'closed loop' manner, but requires the motor to be already running up to a sufficient speed (e.g. up to 10% of the nominal speed) before a sufficient counter voltage is induced to make useful measurements of the induced voltage possible.

The Applicants believe there remains scope for improved motor control techniques.

SUMMARY

A first embodiment of the technology disclosed herein comprises a method of operating an electric motor system to provide a motor load, the electric motor system comprising a motor that comprises: a stator; a rotor having a magnet mounted thereto; and an electric circuit that comprises one or more phases or windings for driving rotation of the rotor when the phases or windings receive an input voltage from an electrical power supply, the input voltage having a variable frequency; and the electric motor system further comprising a controller operable to determine a back EMF induced in the motor stator; the method comprising: during a start-up cycle in which the input voltage frequency is progressively increased: initially operating the motor in an open loop mode in which an open loop rotor angle is estimated based on the input voltage frequency; and when the input voltage frequency reaches a first frequency threshold value, transitioning to a closed loop mode in which a closed loop rotor angle is determined based on the back EMF determined by the controller such that when the input voltage frequency reaches a second frequency threshold value, the motor is operated in the closed loop mode, the first and second frequency threshold values thereby defining a transition period, wherein during the transition period the rotor angle is determined as a function of both the open loop rotor angle and the closed loop rotor angle.

A second embodiment of the technology described herein comprises an electric motor system, the electric motor system comprising a motor that comprises: a stator; a rotor having a magnet mounted thereto; and an electric circuit that comprises one or more phases or windings for driving rotation of the rotor when the phases or windings receive an input voltage from an electrical power supply, the input voltage having a variable frequency; and the electric motor system also comprising a controller operable to determine a back EMF induced in the stator, the controller further comprising a motor control circuit that is configured to: during a start-up cycle in which the input voltage frequency is progressively increased: initially operate the motor in an open loop mode in which an open loop rotor angle is estimated based on the input voltage frequency; and when the input voltage frequency reaches a first frequency threshold value, to cause the motor to start to transition to a closed loop mode in which a closed loop rotor angle is determined based on the back EMF determined by the controller such that when the input voltage frequency reaches a second frequency threshold value, the motor is operated in the closed loop mode, the first and second frequency threshold values thereby defining a transition period, wherein during the transition period the rotor angle is determined as a function of both the open loop rotor angle and the closed loop rotor angle.

The technology described herein relates to electric motors, and in particular to so-called "permanent magnet" electric motor systems. In permanent magnet systems, a magnet is mounted to the rotor to create a permanent magnetic field. The motor is controlled using a variable frequency drive. In order to control the motor speed, rotor position and/or speed are used as feedback to the variable frequency drive. Traditionally, this is done by incorporating position and/or speed sensors into the electric motor itself.

In permanent magnet motor systems there is however a trend towards "sensorless" systems where the rotor position (and speed) is not directly measured, but is instead calculated or estimated based on other parameters. One way to do this is by monitoring the induced voltage in the stator that opposes the driving force (i.e. monitoring the back EMF). This then allows for a 'closed loop' control, which can provide accurate results, e.g. by ensuring the rotor (magnet) is optimally positioned with respect to the motor phase currents for the desired motor operation.

Thus, the motor system comprises a controller that is operable to determine a back EMF induced in the stator. This may be done in any suitable manner, as desired. For instance, this may typically involve the controller executing an appropriate observer algorithm that determines the back EMF. This algorithm may be executed by any suitable processing element of the controller. For example, this may be implemented in hardware or software (including embedded software), as desired, using any suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner. The controller is also configured to determine a rotor angle from the back EMF and use the determined rotor angle when controlling the motor (in a closed loop mode).

This closed loop control can work well, e.g. to provide an accurate motor control. However, at lower rotor speeds, such as during start-up, there is no (or very low) induced voltage in the stator, so this approach only works when the motor is already up to a sufficient speed. For this reason, it is known to perform a 'soft start' where the motor is initially operated using open loop control as the input voltage frequency is progressively increased from zero.

In the open loop regime it is expected (and can be assumed) that the rotor will generally follow the applied voltage. The rotor angle can thus be estimated based on the applied input frequency, using a predetermined relationship. Although the motor operation may not be optimised in this mode (since the motor load will cause the rotor angle to lag behind the applied voltage phases, such that the rotor position cannot be determined very accurately), this can nonetheless generate sufficient torque to bring the motor up to a sufficient speed such that a transition to closed loop control can be made.

Thus, during a start-up cycle, the input voltage frequency is progressively increased (e.g. from zero). At a first threshold voltage frequency (i.e. rotor speed) the motor control can (and does) start to transition from the initial, open loop mode to the closed loop mode of operation.

The inventors hereof recognise that at the point of transition, because the open loop mode does not have an accurate control of the rotor angle, whereas the closed loop angle determination is typically very accurate, there may be an abrupt change in rotor angle. This can introduce a significant mechanical jump. In an extreme case, the sudden change of control angle can cause drastic system instability leading to loss of torque production, which in turn can ultimately cause motor stalling.

To address this, rather than suddenly jumping from the calculated open loop angle to an angle determined from back EMF in closed loop mode, during a transition period, the controller is configured to use a rotor angle that is determined as a function of both the open loop rotor angle and the closed loop rotor angle. This therefore provides a smoother transition to the closed loop control. The controller thus comprises a control circuit that is configured to determine the rotor angle during the transition period. Again, this determination can be implemented in software or hardware, as desired. Further, this control circuit may be a separate processing element to that which determines the back EMF or may be part of the same processing element.

In embodiments, the rotor angle is determined during the transition period as a weighted average of the open loop rotor angle and the closed loop rotor angle.

The transition from open loop to closed loop operation may be performed over a pre-set frequency range (the 'transition period' between the first and second threshold values).

In embodiments, during the transition period the rotor angle is determined as a function of the input voltage frequency such that the determined rotor angle changes in a smooth and continuous manner from a first rotor angle value at the first frequency threshold value to a second rotor angle value at the second frequency threshold value. For instance, in embodiments, the rotor angle, A, at a frequency, f, is determined according to the function:

$$A = \frac{A_1(f_2 - f)}{(f_2 - f_1)} + \frac{A_2(f - f_1)}{(f_2 - f_1)}$$

where $f_1$ is the first frequency threshold value, $f_2$ is the second frequency threshold value, $A_1$ is the rotor angle at the first frequency threshold value (and therefore corresponds to the rotor angle as determined in open loop mode of operation), $A_2$ is the rotor angle at the second frequency threshold value (and therefore corresponds to the rotor angle as determined in the closed loop mode of operation using the back EMF), and f is a frequency during the transition period such that $f_1 < f < f_2$.

However, other arrangements would of course be possible including, but not limited to, changing the rotor angle during the transition period in a stepped or discrete manner. For instance, the rotor angle determination during the transition period may be performed in one or more discrete steps, with each discrete step using a different function (e.g. a different weighted average) of the open loop rotor angle and the closed loop rotor angle such that there is a gradual transition from the open loop rotor angle when the input voltage frequency is at the first threshold value to the closed loop rotor angle when the input voltage frequency is at the second threshold value. Thus, in some embodiments, the transition comprises plural discrete steps with each step applying a different weighted average (with different proportions of the open loop and closed loop angles).

In that case, in an exemplary embodiment, the angle may initially be determined (in the open loop mode, e.g. up to the first threshold value) solely based on the input voltage frequency and may ultimately (in the closed loop mode, e.g. after the second threshold value) be determined solely based on the back EMF. However, during the transition period there may be a number of steps where the angle is determined using different proportional combinations of the open loop and closed loop angles. For instance, the proportion of the closed loop angle may increase from 0% to 100% over the transition period, e.g., and in embodiments, in a number of discrete steps, such as by increasing from 0% to 25% to 50% to 75% to 100%. Various other arrangements would of course be possible.

The electric motor may be any suitable electric motor. In embodiments, the electric motor is a three phase motor. Subject to the particular requirements of the technology described herein, however, the electric motor may otherwise be constructed and operated in any suitable manner, as desired.

The electric motor and methods of operating an electric motor described herein may find utility in any suitable system where motor loads are desired. In some embodiments the electric motor is provided on-board an aircraft, e.g., for providing aircraft motor loads, e.g. for controlling flight control surfaces, landing gear, actuators, fans, pumps, and the like. Various other examples would be possible.

The methods in accordance with the technology described herein may be implemented at least partially using software e.g. embedded software. The controller may thus comprise a suitable microprocessor or microcontroller that is configured to execute software to perform the various operations described herein.

It will thus be seen that when viewed from further embodiments the technology described herein provides software specifically adapted to carry out the methods herein described when installed on a suitable data processor, a computer program element comprising software code portions for performing the methods herein described when the program element is run on a data processor, and a computer program comprising code adapted to perform all the steps of a method or of the methods herein described when the program is run on a data processing system.

Other arrangements would however be possible. For instance, the methods may also be implemented at least partially using appropriately dedicated hardware elements (processing circuitry) and/or programmable hardware elements (processing circuitry, e.g. such as a programmable FPGA (Field Programmable Gate Array)) that form part of the motor controller and can be programmed to operate in the desired manner.

Various embodiments will now be described, by way of example only, with reference to the drawings.

BRIEF DESCRIPTION OF DRAWINGS

Like reference numerals are used for like components where appropriate in the Figures.

DETAILED DESCRIPTION

Figure 1:
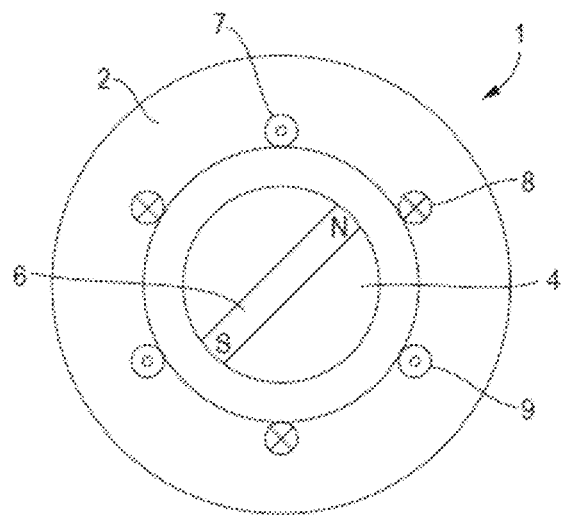
FIG. 1 shows a schematic of a part of a motor according to an embodiment.

FIG. 1 shows a schematic of a part of a motor 1 according to an embodiment of the technology described herein. The motor is a three-phase motor comprising a stator 2, a rotor 4, a permanent magnet 6 mounted on the rotor 4, and three phases or windings 7, 8, 9 (hereinafter referred to as windings) for driving rotation of a rotor. However, embodiments are contemplated in which the motor is a multi-phase motor other than a three-phase motor, and/or which comprise a number of windings other than three.

Figure 2:
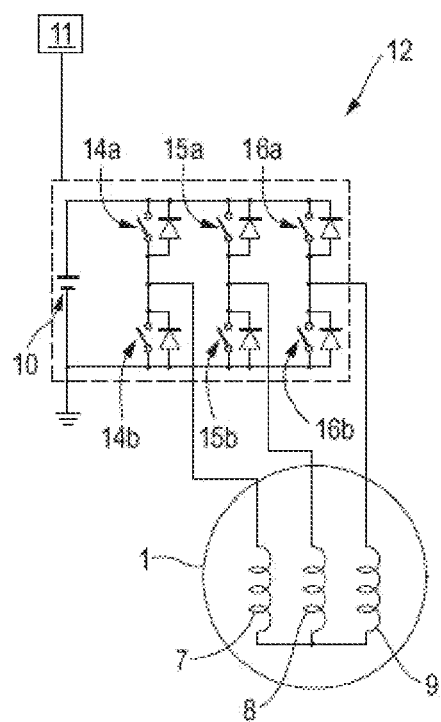
FIG. 2 shows a schematic of a part of a motor drive system for use with the motor of FIG. 1.

FIG. 2 shows a schematic of a part of a motor drive system for use with the motor of FIG. 1. In this embodiment, the motor drive system includes a DC power supply 10 having a positive terminal and a relatively negative terminal (e.g. a ground terminal), three motor phases or windings 7, 8, 9 for driving rotation of the rotor 4 (shown in FIG. 1), and a motor drive unit 12 comprising an inverter for selectively electrically connecting the motor phases or windings 7-9 to the positive and negative terminals of the power supply 10. In the depicted embodiment the three phases or windings 7-9 are electrically connected to each other by a first end of each of the windings being connected at a common point. The second end of each of the windings is connected to the motor drive unit 12. However, other configurations are contemplated herein. For example, the motor 1 may comprise only two phases or windings or more than three phases or windings. Alternatively, or additionally, the phases or windings 7-9 may not be connected at a common point. It is also contemplated that an AC power supply may be provided that is converted to provide said DC power supply 10.

The inverter in the motor drive unit 12 comprises a plurality of switches 14-16 that are closed and opened so as to connect and disconnect the second end of each phase or winding 7-9 to and from the positive and negative terminals of the power supply 10. More specifically, the second end of each phase or winding 7, 8, 9 is electrically connected to the positive terminal of the power supply 10 via its own switch 14a, 15a, 16a, such that when the switch is closed the second end of that phase or winding is connected to the positive terminal and when the switch is opened the second end of that phase or winding is disconnected from the positive terminal. The second end of each phase or winding is also electrically connected to the negative terminal of the power supply 10 via its own switch 14b, 15b, 16b, such that when the switch is closed the second end of that phase or winding is connected to the negative terminal and when the switch is opened the second end of the phase or winding is disconnected from the negative terminal.

In FIG. 2, there is also illustrated a controller 11 for the motor. This controller 11 may for example, and typically is, included in the same box as the inverter in the motor drive unit 12. For instance, the controller 11 is in embodiments configured to control the switching patterns of the switches 14-16 for the inverter to control the motor operation. The controller 11 is further configured to implement a back EMF observer algorithm that is operable to monitor a back EMF induced in the stator during motor operation. For example, the controller 11 may comprise a microprocessor that executes embedded software in order to control the motor operation and, as part of this overall control operation, executes a program for monitoring the back EMF, and determining the motor position and speed accordingly. Thus, the algorithm may calculate the motor position and speed based on measured currents and the motor phase voltages. The motor phase voltages may be inferred from the switching activity of the power transistors 14a, 14b, 15a, 15b, 16a, 16b. This can be used to operate the electric motor according to a 'closed loop' scheme, and in a "sensorless" manner, as will be explained further below.

Sensorless motor control has been an area of active research in the past decades. Sensorless methods have been developed aiming to avoid the reliance on position encoders and resolvers that are typically embedded within certain types of motors. Resolvers and position encoder devices are used to inform the motor controller of the rotor's angle. This angle is significant for certain motors, including permanent magnet synchronous motors, where the phase voltages, currents and the stator's magnetic field need to be oriented and synchronized to the rotor's magnetic field in order to produce torque.

Sensorless methods can be broadly classified to model-based, saliency based and open loop methods. Model based methods such as back EMF observers can only function at medium to high motor speed. For example, back EMF observers rely on electrical characteristics which are observable only when the motor when it is spinning. In particular, the back EMF voltage components $e_{alpha}$ and $e_{beta}$ are a function of speed and angle as per equations 1 and 2 below.

$$e_{alpha} = -k_e * \omega * \sin(\vartheta) \qquad \text{Equation 1}$$

$$e_{beta} = k_e * \omega * \cos(\vartheta) \qquad \text{Equation 2}$$

As a consequence, the back EMF observer cannot function at standstill and does not function very accurately at low speeds.

Figure 3A:
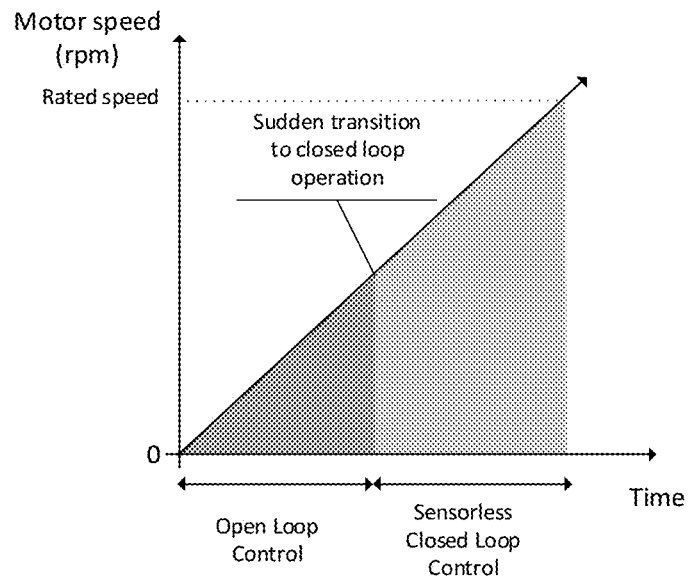
FIGS. 3a and b show schematically a hybrid control scheme where the motor is initially operated according to an open-loop mode to bring the motor up to speed, at which point a transition to closed-loop mode is made.

One way to accelerate a motor at high enough speed for the back EMF observer to function is to initially accelerate the motor using an 'open loop' control method. In such hybrid schemes the motor is accelerated in open loop and there is a transition point where the model-based method takes over to closed loop (see FIG. 3a). As shown in FIG. 3a, the motor is accelerated in an open loop mode operation and when the back EMF is high enough, the transition to closed loop operation takes place.

Figure 4:
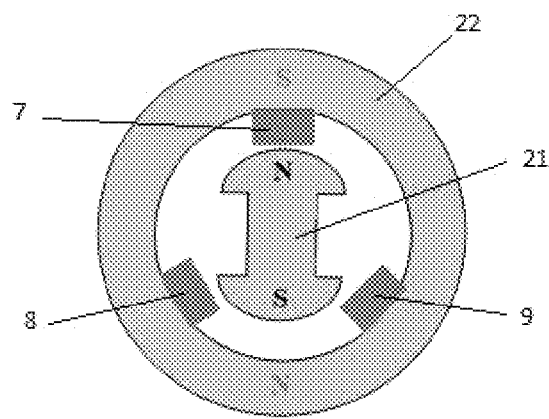
FIG. 4 shows the initial open-loop rotor alignment for a single pole pair permanent magnet synchronous motor.

Note that an additional initial step prior to open loop acceleration is performed, namely the open loop alignment where the stator's magnetic field is oriented at a constant angle so as to allow the rotor's magnetic poles to align the opposite stator's magnetic poles as shown in FIG. 4. Thus, as shown in FIG. 4, the rotor 21 is initially aligned, at 0 deg, with the stator 22.

Figure 5:
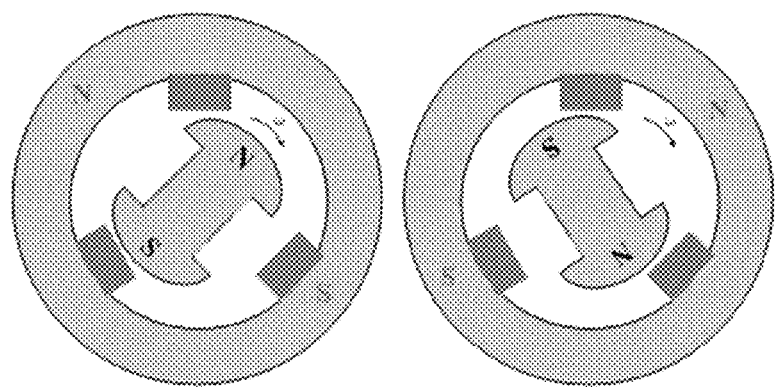
FIG. 5 shows the rotor positions for open-loop acceleration for a single pole pair permanent magnet synchronous motor.

After the rotor initial position is ensured, the stators magnetic field angle increments gradually generating torque and rotation to the rotor. The angular speed of the stator's magnetic field is equal to with the average speed of the rotor as the N-S pole pairs of stator rotor are attracted to the equivalent opposite poles of the stator, as shown in FIG. 5.

Figure 3B:
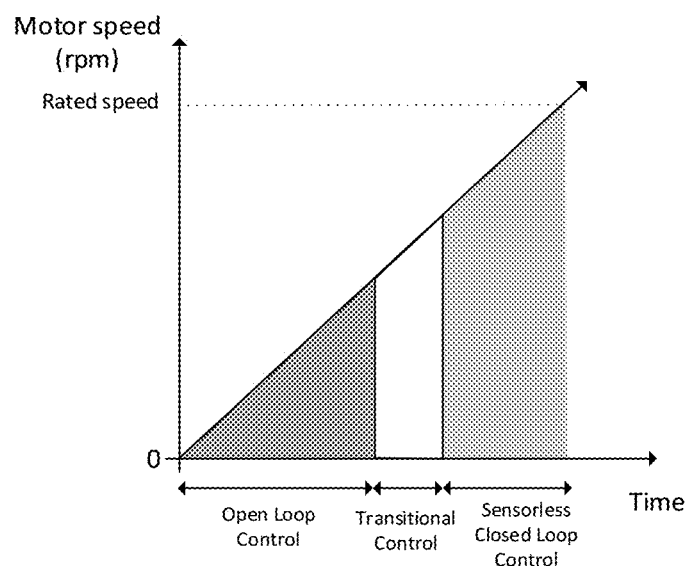

The open loop to closed loop transition depicted in FIG. 3a is used extensively in industry. However, the present Applicants have recognised that this transition point can be mechanically harsh as there is a sudden transition between the rotor angle as determined in open loop mode and the rotor angle as determined in closed loop mode when the observer is enabled. The present Applicants therefore propose an improved method to enable a smoother transition between this open loop to closed loop sensorless operation, as shown in FIG. 3b. FIG. 3b thus shows a similar process to FIG. 3a, with an additional transitional regime between the open loop and closed loop operations according to an embodiment.

Figure 6:
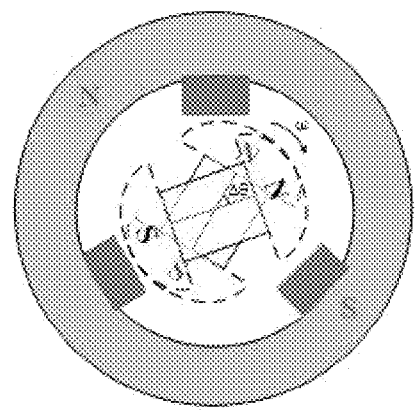
FIG. 6 shows the open loop variability of the rotor position compared to the stator field.

For instance, the gradual acceleration performed in the open-loop mode uses an internally calculated reference angle as a substitute to the position angle from the back EMF observer. This angle controls the motor stator currents in open loop operation. The physical angle between rotor position and stator current varies between 0 deg and 90 deg during open loop acceleration. The maximum motor efficiency situation where the stator's field is at 90 degrees in relation to the rotor will rarely be true in open loop operation. For instance, friction, inertia, load torque and selected acceleration will create substantial variability of open loop angle versus actual rotor angle as best shown in FIG. 6. In closed loop operation, where there is better (more accurate) knowledge of the rotor angle, the control can however better ensure the optimal motor operation at an angle of 90 deg. Thus, a mechanical shock can be caused if the open loop angle was to suddenly change to the optimal closed loop angle at the transition between the two operation modes.

Figure 7:
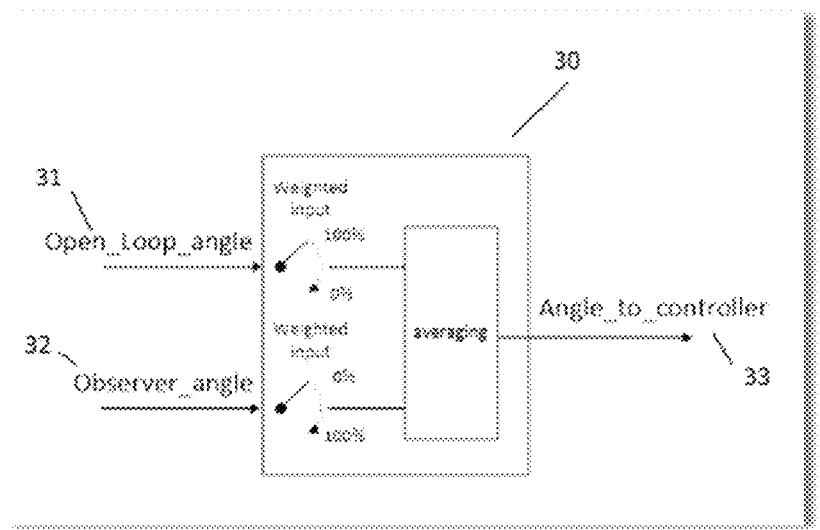
FIG. 7 shows a control circuit (block) for determining the rotor position during the transition period according to an embodiment.

To minimize the mechanical shock at the transition point between open loop and closed loop sensorless control, the present embodiment proposes to use transitional angles calculated as the weighted average between the internally calculated angle during open loop operation and the angle produced by the sensorless observer in closed loop operation. As shown in FIG. 7, this involves a control circuit (processing block) 30 having as inputs:

calculated open loop angle 31
model based observer (closed loop) angle 32

The block calculates its output 33 as a weighted average where initially 100% is taken from the open loop angle 31, and as time progresses the model based observer angle 32 reaches 100% of the weighted average. This output 33 is then provided to the motor controller 11 for use in controlling the motor.

For example, a transitional angle A at a frequency f may be calculated according to the following formula:

$$A = \frac{A_1(f_2 - f)}{(f_2 - f_1)} + \frac{A_2(f - f_1)}{(f_2 - f_1)} \qquad \text{Equation 3}$$

Where $A_1$ is the open loop angle and $A_2$ is the closed loop angle, and frequencies $f_1$ and $f_2$ are the limits of the transitional regime, with $f_1 < f < f_2$. In this way, during the transition period as illustrated in FIG. 3b, the rotor angle is progressively varied from the open loop angle $A_1$ to the closed loop angle $A_2$ as the frequency is increased. This then ensures a smooth transition from open loop to closed loop operation. It will be appreciated that this is just one example and any suitable formula may be used to calculate appropriate transitional angles to provide a smoother transition. For example, in some cases, rather than using a smooth, continuous transition, as may be achieved using Equation 3, the rotor angle may be increased in a discrete or stepped manner.

The above methods ensure that the angle entering the control loops does not suffer sudden changes. This in turn ensures smooth motor control at all speeds. The technology described herein can therefore ensure smoother sensorless transition from open loop to closed loop control without an impact on control quality. This benefits the system stability and lowers mechanical stress leading to lower failure rates and lower noise levels.

Variations on the examples described above fall within the scope of the claims.

The invention claimed is:

1. A method of operating an electric motor system to provide a motor load, the electric motor system comprising:
    a motor comprising:
        a rotor having a magnet mounted thereto;
        a motor stator that comprises one or more phases or windings for driving rotation of the rotor when the phases or windings receive an input voltage from an electrical power supply, the input voltage having a variable frequency; and
        a controller that is operable to determine a back EMF induced in the motor stator;

the method comprising:
during a start-up cycle in which the input voltage frequency is progressively increased:
initially operating the motor in an open loop mode in which an open loop rotor angle is estimated based on the input voltage frequency;
operating the motor during a transition period where the rotor angle is determined based on both the open loop rotor angle of the open loop mode and a closed loop rotor angle of a closed loop mode, wherein the transition period is defined between a first input voltage frequency threshold and a second input voltage frequency threshold; and
after the input voltage frequency reaches the second input voltage frequency threshold, operating in the closed loop mode,
wherein the closed loop rotor angle is determined based on the back EMF determined by the controller.

2. The method of claim 1, wherein during the transition period the rotor angle is determined as a weighted average of the open loop rotor angle and the closed loop rotor angle.

3. The method of claim 1, wherein during the transition period the rotor angle is determined as a function of the input voltage frequency such that the determined rotor angle changes in a smooth and continuous manner from a first rotor angle value at the first input voltage frequency threshold value to a second rotor angle value at the second input voltage frequency threshold value.

4. The method of claim 1, wherein during the transition period the rotor angle determination is performed in one or more discrete steps, with each discrete step using a different function of the open loop rotor angle and the closed loop rotor angle such that there is a gradual transition from the open loop rotor angle when the input voltage frequency is at the first input voltage threshold value to the closed loop rotor angle when the input voltage frequency is at the second input voltage threshold value.

5. The method of claim 4, wherein during the transition period the rotor angle is determined as a weighted average of the open loop rotor angle and the closed loop rotor angle, and wherein at each discrete step a different weighted average of the open loop rotor angle and the closed loop rotor angle.

6. A method of operating an electric motor system to provide a motor load, the electric motor system comprising:
a motor comprising:
a rotor having a magnet mounted thereto;
a motor stator that comprises one or more phases or windings for driving rotation of the rotor when the phases or windings receive an input voltage from an electrical power supply, the input voltage having a variable frequency; and
a controller that is operable to determine a back EMF induced in the motor stator;
the method comprising:
during a start-up cycle in which the input voltage frequency is progressively increased:
initially operating the motor in an open loop mode in which an open loop rotor angle is estimated based on the input voltage frequency;
operating the motor during a transition period where the rotor angle is determined based on both the open loop rotor angle of the open loop mode and a closed loop rotor angle of a closed loop mode, wherein the transition period is defined between a first input voltage frequency threshold and a second input voltage frequency threshold; and
after the input voltage frequency reaches the second input voltage frequency threshold, operating in a closed loop mode,
wherein the closed loop rotor angle is determined based on the back EMF determined by the controller,
wherein during the transition period, the rotor angle is determined as a function of the input voltage frequency such that the determined rotor angle changes in a smooth and continuous manner from a first rotor angle value at the first frequency threshold value to a second rotor angle value at the second input voltage frequency threshold value,
wherein during the transition period the rotor angle, A, at a frequency, f, is determined according to the function:

$$A = \frac{A_1(f_2 - f)}{(f_2 - f_1)} + \frac{A_2(f - f_1)}{(f_2 - f_1)}$$

where $f_1$ is the first input voltage frequency threshold value, $f_2$ is the second input voltage frequency threshold value, $A_1$ is the rotor angle at the first input voltage frequency threshold value, $A_2$ is the rotor angle at the second input voltage frequency threshold value, and f is a frequency during the transition period such that $f_1 < f < f_2$.

7. The method of claim 6, wherein during the transition period the rotor angle determination is performed in one or more discrete steps, with each discrete step using a different function of the open loop rotor angle and the closed loop rotor angle such that there is a gradual transition from the open loop rotor angle when the input voltage frequency is at the first input voltage threshold value to the closed loop rotor angle when the input voltage frequency is at the second threshold value.

8. The method of claim 7, wherein during the transition period the rotor angle is determined as a weighted average of the open loop rotor angle and the closed loop rotor angle, and wherein at each discrete step a different weighted average of the open loop rotor angle and the closed loop rotor angle.

9. The method of claim 7, wherein discrete steps include steps where the closed loop rotor angle increases from 0% to 25%, then from 50% to 75% and then to 100%.

10. An electric motor system comprising:
a motor that comprises:
a rotor having a magnet mounted thereto;
a motor stator that comprises one or more phases or windings for driving rotation of the rotor when the phases or windings receive an input voltage from an electrical power supply, the input voltage having a variable frequency; and
a controller that is operable to determine a back EMF induced in the motor stator, the controller further comprising a motor control circuit that is configured to:
during a start-up cycle in which the input voltage frequency is progressively increased:
initially operate the motor in an open loop mode in which an open loop rotor angle is estimated based on the input voltage frequency;
operate the motor during a transition period where the rotor angle is determined based on both the open loop rotor angle of the open loop mode and a closed loop rotor angle of a closed loop mode, wherein the transition period is defined between a first input voltage frequency threshold and a second input voltage frequency threshold; and after the input voltage reaches the second input voltage frequency threshold, operate in the closed loop mode, wherein the closed loop rotor angle is determined based on the back EMF determined by the controller.

11. The system of claim 10, wherein during the transition period the motor control circuit is configured to determine the rotor angle as a weighted average of the open loop rotor angle and the closed loop rotor angle.

12. The system of claim 10, wherein during the transition period the motor control circuit is configured to determine values for the rotor angle as a function of the input voltage frequency such that the determined rotor angle changes in a smooth and continuous manner from a first rotor angle value at the first input voltage frequency threshold value to a second rotor angle value at the second input voltage frequency threshold value.

13. The system of claim 12, wherein during the transition period the rotor angle, A, at a frequency, f, is determined according to the function:

$$A = \frac{A_1(f_2 - f)}{(f_2 - f_1)} + \frac{A_2(f - f_1)}{(f_2 - f_1)}$$

where $f_1$ is the first input voltage frequency threshold value, $f_2$ is the second input voltage frequency threshold value, $A_1$ is the rotor angle at the first frequency threshold value, $A_2$ is the rotor angle at the second input voltage frequency threshold value, and f is a frequency during the transition period such that $f_1 < f < f_2$.

14. The system of claim 10, wherein during the transition period the motor control circuit is configured to determine values for the rotor angle in one or more discrete steps, with each discrete step using a different function of the open loop rotor angle and the closed loop rotor angle such that there is a gradual transition from the open loop rotor angle when the input voltage frequency is at the first input voltage threshold value to the closed loop rotor angle when the input voltage frequency is at the second input voltage threshold value.

15. The motor of claim 14, wherein during the transition period the motor control circuit is configured to determine the rotor angle as a weighted average of the open loop rotor angle and the closed loop rotor angle, and wherein at each discrete step a different weighted average of the open loop rotor angle and the closed loop rotor angle.

* * * * *